(12) United States Patent
Katsaros et al.

(10) Patent No.: US 9,851,273 B2
(45) Date of Patent: Dec. 26, 2017

(54) SEAL AND BEARING ASSEMBLY INCLUDING THE SEAL

(71) Applicants: Padelis Katsaros, Schweinfurt (DE); Volker Wendt, Üchtelhausen/Zell (DE)

(72) Inventors: Padelis Katsaros, Schweinfurt (DE); Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 43 days.

(21) Appl. No.: 14/949,450

(22) Filed: Nov. 23, 2015

(65) Prior Publication Data

US 2016/0146254 A1    May 26, 2016

(30) Foreign Application Priority Data

Nov. 21, 2014   (DE) .................. 10 2014 223 829

(51) Int. Cl.
| | |
|---|---|
| *F16C 33/78* | (2006.01) |
| *G01L 19/00* | (2006.01) |
| *G01K 7/02* | (2006.01) |
| *G01K 13/02* | (2006.01) |
| *G01K 13/08* | (2006.01) |
| *F16C 41/00* | (2006.01) |
| *F16C 19/36* | (2006.01) |
| *F16C 19/38* | (2006.01) |

(52) U.S. Cl.
CPC ............ *G01L 19/00* (2013.01); *F16C 33/782* (2013.01); *F16C 33/7813* (2013.01); *F16C 41/007* (2013.01); *G01K 7/02* (2013.01); *G01K 13/02* (2013.01); *G01K 13/08* (2013.01); *G01L 19/0092* (2013.01); *F16C 19/364* (2013.01); *F16C 19/386* (2013.01)

(58) Field of Classification Search
CPC ... F16C 41/007; G01L 19/0092; G01K 13/02; G01K 13/08
See application file for complete search history.

(56) References Cited

U.S. PATENT DOCUMENTS

| 4,732,494 A | * | 3/1988 | Guers ................. F16C 33/78 |
| | | | 324/207.22 |
| 5,184,069 A | * | 2/1993 | Adler ................. G01P 3/443 |
| | | | 324/174 |

(Continued)

FOREIGN PATENT DOCUMENTS

| DE | 102004023315 A1 | 12/2002 |
| DE | 102011014545 A1 | 7/2012 |

*Primary Examiner* — Thomas R Hannon
(74) *Attorney, Agent, or Firm* — Bryan Peckjian; SKF USA Inc. Patent Dept.

(57) ABSTRACT

A seal configured to seal a gap between a first component and a second component to at least partially retain a fluid on a first side of the seal in a space between the first component and the second component, the seal including a seal body having a radially outer periphery and a central opening configured to receive the first component or the second component, at least one sensor configured to detect a characteristic of the fluid and an adapter. The at least one sensor is disposed on the adapter, and the adapter has a first portion extending through the seal body at a location spaced from and radially between the radially outer periphery and the central opening and a second portion axially abutting the seal body on the first side of the seal.

13 Claims, 13 Drawing Sheets

(56) References Cited

U.S. PATENT DOCUMENTS

| | | | | |
|---|---|---|---|---|
| 5,470,157 A * | 11/1995 | Dougherty | ............ | F16C 33/7886 324/207.25 |
| 5,602,539 A * | 2/1997 | Lemoine | ................. | B21B 31/07 340/682 |
| 6,045,267 A * | 4/2000 | Merklein | ................. | G01P 3/443 384/448 |
| 6,894,484 B2 * | 5/2005 | Takizawa | ................. | B60T 8/171 310/155 |
| 6,903,546 B2 * | 6/2005 | Nakano | ................. | G01D 11/245 324/207.25 |
| 7,126,328 B2 * | 10/2006 | Sakamoto | ............. | F16C 41/007 324/207.25 |
| 2009/0136167 A1 * | 5/2009 | Morita | ................... | F16C 19/525 384/448 |
| 2010/0013463 A1 * | 1/2010 | Ozaki | .................... | G01D 5/245 324/207.2 |

* cited by examiner

SEAL AND BEARING ASSEMBLY INCLUDING THE SEAL

CROSS-REFERENCE

This application claims priority to German patent application no. 10 2014 223 829.3 filed on Nov. 21, 2014, the contents of which are fully incorporated herein by reference.

TECHNOLOGICAL FIELD

Exemplary embodiments relate to a seal device configured to seal a gap between a first component and a second component in order to at least partially retain a fluid that is located between the first component and the second component, and to a bearing assembly including the seal device.

BACKGROUND

Seals or seal devices are used in a variety of applications for sealing between components. These can be components that are movable relative to one another, for example rings of a bearing, or a housing and a shaft, or components that are not movable relative to one another. The fluid being sealed can be air or another gas, or it can be a liquid, such as a lubricant, a lubricating oil, a lubricating liquid, or a lubricating grease. In addition, it is often desirable to detect a characteristic or a state parameter of a fluid behind a seal, such as its temperature and/or pressure.

In the bearing field, for example, it is sometimes possible to draw conclusions about friction levels or the operating state of a bearing by measuring a temperature and/or pressure in the bearing, that is, in the fluid surrounding the bearing elements. This is conventionally accomplished by attaching or disposing a temperature sensor, for example, a thermocouple or a pressure sensor, in a bearing interior. In order to place the corresponding sensor in the bearing assembly and have access to signals produced by the sensor, bores and/or groves may be provided in a non-rotating bearing component, for example, a bearing ring, to make attachment of the temperature sensor or of the pressure sensor possible. However, under certain unfavorable circumstances the bores and/or the grooves can weaken the component in which the bore or grooves are formed. A structural strength of the component may thereby be reduced. Of course the cost of forming any required bores and/or grooves in the (usually hardened) bearing rings is also not negligible. Under certain circumstances this problem can also occur with other components sealed with respect to one another and between which a fluid is located whose temperature and/or pressure is to be determined.

SUMMARY

There is therefore a need for an improved method and apparatus for measuring a temperature and/or a pressure between two components, such as bearing components. This needed is met by the seal device and the bearing assembly disclosed herein.

Exemplary embodiments relate to a seal or seal device (these terms may be used interchangeably herein). The seal is configured to seal a gap between a first component and a second component to at least partially retain a fluid located between the first component and the second component. A sensor is disposed on the seal and configured to detect a temperature and/or a pressure of the fluid. Since the sensor is disposed on the seal itself and not on one of the components, in some exemplary embodiments the integrity or stability of the component can be increased or at least maintained. Additionally, this may simplify the application or attachment of the sensor. This may be possible because the seal is manufactured from a softer and more easily workable material than the component (e.g., the bearing ring), and the seal usually has no function for the stability of the other component, or the seal assembly, or a bearing assembly wherein the seal is used.

A seal that at least partially seals the gap between two components may also prevent particles, for example dust, dirt, or the like, from outside the seal from penetrating into the gap and between the two components. Under certain conditions the seal can also prevent a fluid or a medium that is located between the two components from escaping through the gap. The medium can be, for example, air or another gas, or a liquid, for example a lubricant, a lubricating oil, a lubricating liquid, or a lubricating grease, and/or the like. Under certain circumstances the seal can also allow small amounts of fluid to escape through the seal in order to prevent the entry of particles from outside the seal. The possibility of allowing a small, known amount of grease or liquid to escape through the seal is what is meant by a seal that "at least partially retains" the fluid.

The first component can be configured such that it is movable relative to the second component. In some exemplary embodiments friction can arise due to the relative movement of the two components with respect to each other. The amount of friction being generated can be detected by monitoring changes in pressure and/or temperature. The relative movement can be, for example, a rotational movement and/or a translational movement of the components.

Additionally or alternatively the seal can be configured such that it is stationary with respect to at least one of the two components. In some exemplary embodiments, since the seal does not move relative to at least one of the two components, the connection of the sensor to an evaluation unit or power supply unit can be simplified. For example, the seal can be disposed on the component that does not rotate or that is stationary. A seal that is stationary relative to a component may, for example, not rotate with respect to the component and also not move in the axial direction with respect to the component. Likewise the component may also not perform these movements with respect to the seal. For example, the seal can be a radial seal.

The sensor can, for example, be attached to a support structure of the seal. For this purpose any type of attaching, for example, adhering, welding, clamping, screwing, riveting, latching, or the like, is contemplated. The support structure may be a part of the seal, that is, a portion via which the seal is disposed on the first component for conjoint rotation therewith. A seal lip of the seal can protrude from the support structure in the radial direction opposite the first component. In other words, the support structure is a part or body ("seal body") of the seal away from the actual seal lip that makes sealing contact with the second component. The second component can then optionally rotate with respect to the seal and the first component while making sliding contact with the seal lip.

Additionally or alternatively, the sensor may protrude in an axial direction, that is a direction parallel to the rotational axis of at least one of the components of the seal. Thus in some exemplary embodiments the sensor protrudes far enough into a space or gap between the two components to directly detect a temperature between the components. For example, the sensor can protrude from the seal by an amount equal to at least half the axial thickness of the seal, or by an amount equal to 2, 3, 4, 5 or 10 times the axial thickness of the seal. The sensor can, for example, be disposed on an inner side of the seal, that is, on the side of the seal that faces the fluid and/or rolling elements of a bearing.

Additionally or alternatively, the seal can include a sensor opening in which the sensor may be disposed and/or attached. This may make it possible for at least one terminal to be led out of the seal or the gap. The terminal can, for example, serve to connect the sensor to a power supply unit and/or an evaluating unit.

The sensor opening may be smaller than the main center opening of an annular seal, the main opening being the opening concentric with a rotational axis of one the sealed components. The sensor opening will thus generally be eccentric relative to the main center opening of the seal. In other words, the sensor opening is located in the seal body between the outer periphery of the seal and the central opening of the seal.

In some exemplary embodiments the sensor is disposed on an adapter component that is attached to the seal which may simplify the attaching and/or positioning of the sensor. Under certain circumstances this may simplify the sealing or closing of the sensor opening.

The adapter component can include an axial stop configured to attach the adapter component to the seal in the axial direction. In some exemplary embodiments this may simplify the positioning of the sensor in the axial direction and/or prevent the sensor from slipping out of the seal.

Additionally or alternatively a sealing material can be disposed between the seal and the sensor disposed in the sensor opening or the adapter component disposed in the sensor opening. In some exemplary embodiments the seal can then be leak-proof despite the presence of the sensor opening.

Additionally or alternatively, the adapter component can include a terminal structure configured to connect the sensor to a power supply unit and/or an evaluating unit (such as a computer having a microprocessor). In some exemplary embodiments sealing between the seal and the sensor can be omitted and instead only occur between the possibly less-sensitive adapter component and the seal.

Exemplary embodiments also relate to a bearing assembly including a seal according to at least one of the described exemplary embodiments. Here the first component can be a bearing inner ring and the second component can be a bearing outer ring, and the sensor can be configured and disposed to measure a pressure and/or a temperature in a bearing interior. Alternatively the first component can also be a shaft and the second component can be a housing.

The exemplary embodiments and their individual features disclosed in the above description, the following claims, and the accompanying Figures can be meaningful and implemented both individually and in any combination for the realization of an exemplary embodiment in its various designs.

DETAILED DESCRIPTION

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

Figure 1:
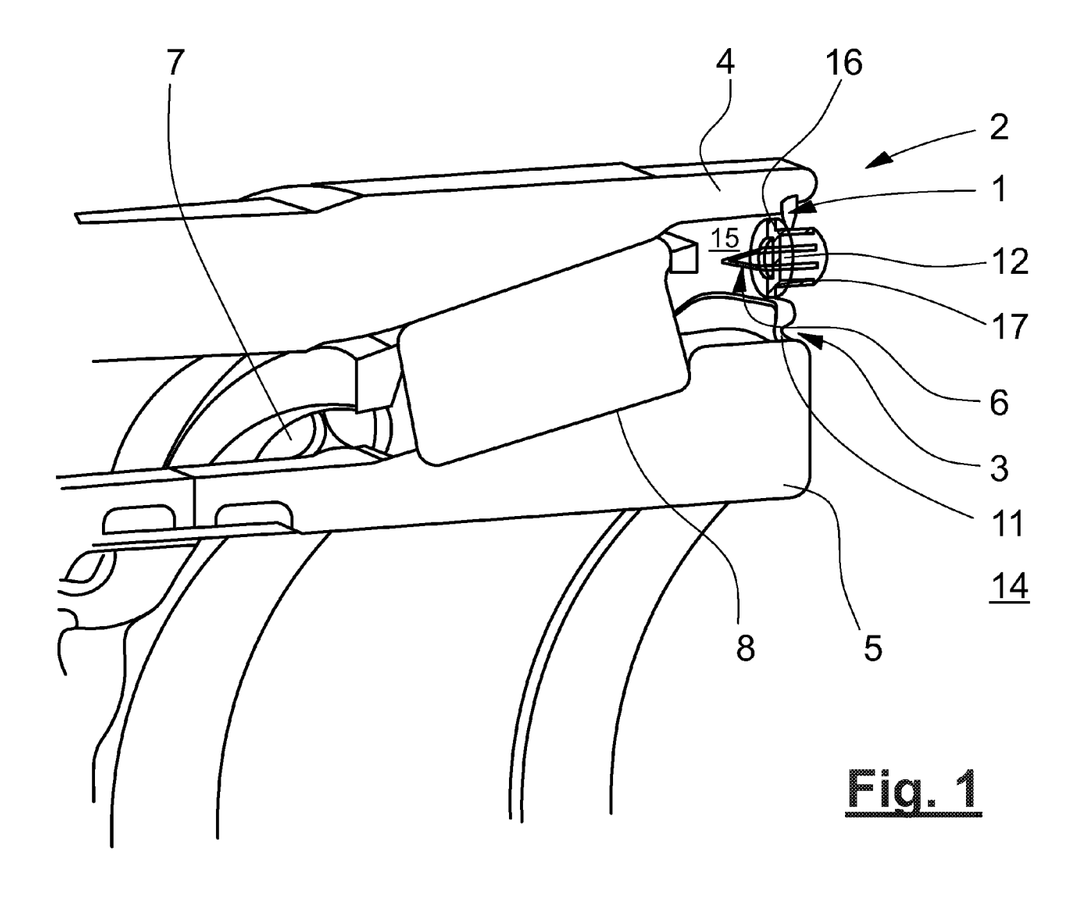
FIG. 1 is a perspective view, partly in section, of a seal in a bearing assembly according to an exemplary embodiment.
Figure 2:
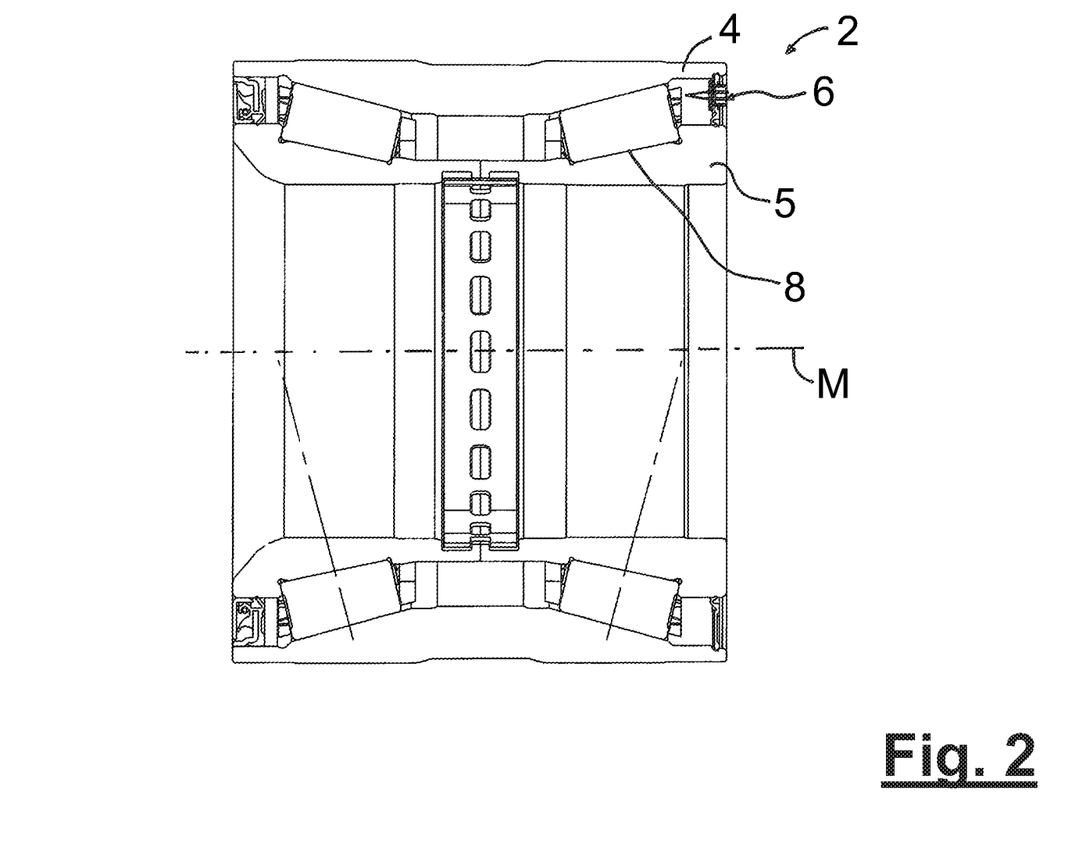
FIG. 2 is a perspective view, partly in section, of a bearing assembly including the seal according to the exemplary embodiment of FIG. 1.
Figure 3:
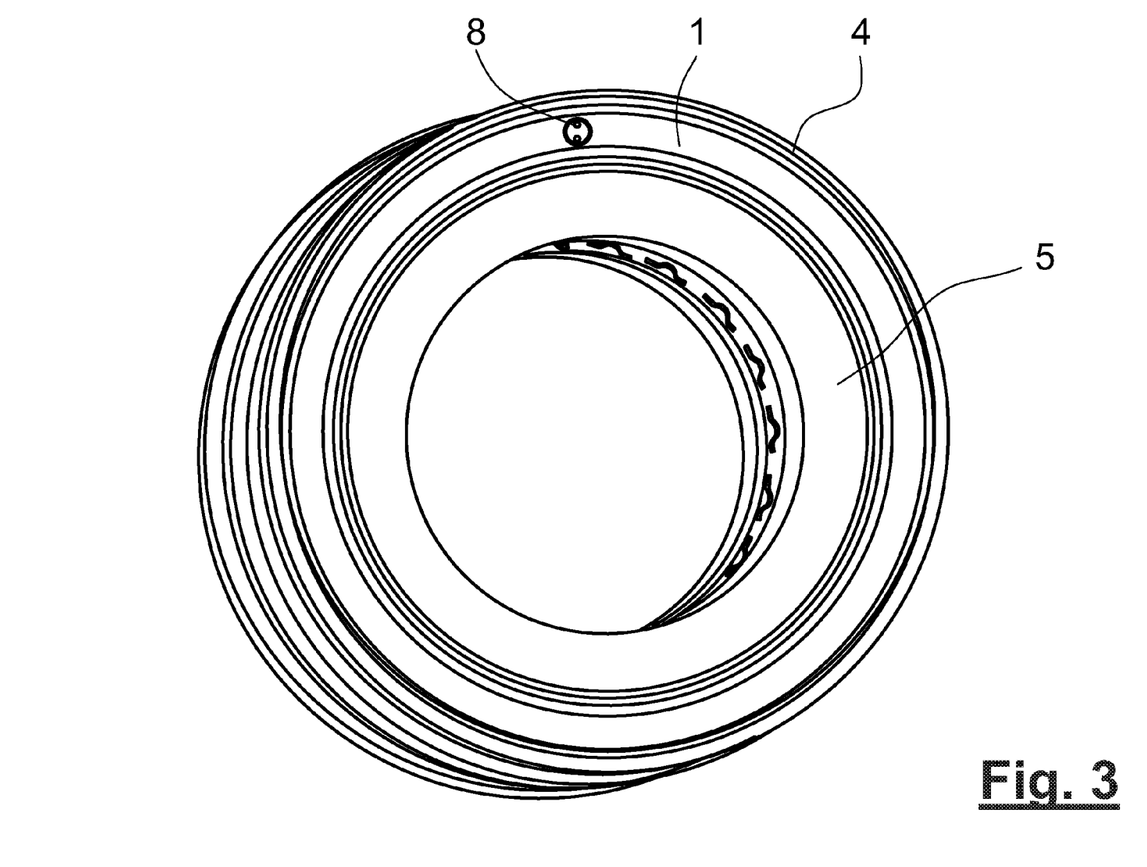
FIG. 3 is a perspective view of the bearing assembly of FIG. 2.

FIGS. 1 to 3 are different schematic depictions of a seal 1 in a bearing assembly 2 according to an exemplary embodiment. The seal 1 is configured to seal a gap 3 between a first component 4 and a second component 5 to at least partially retain a fluid located between the first component 4 and the second component 5. The seal 1 comprises at least one sensor 6, in this case, a sensor configured to detect a temperature of the fluid. In the exemplary embodiment the bearing assembly 2 is a radial tapered roller bearing. The first component 4 is an outer ring of a rolling-element bearing, and the second component 5 is an inner ring of the rolling-element bearing. The bearing rings are concentric relative to each other. A plurality of rolling elements 7 is guided in the radial direction between the two bearing rings.

In some other, not-depicted exemplary embodiments the first component and the second component can comprise any other components that form a gap therebetween, for example, bearing rings of a sliding bearing, or a shaft and a housing, or the like.

The seal 1 is disposed axially outward from a raceway 8 for the rolling elements 7 and outward of each flange of the components 4 and 5. The seal 1 is disposed completely between the two components 4 and 5 in the axial and radial directions. In some further, not-depicted exemplary embodiments the seal can protrude in the axial direction and/or in the radial direction out of the gap between the two components.

In the exemplary embodiment the seal 1 is a radial seal, for example, a radial shaft seal. The seal 1 is configured as a ring. In addition to a seal lip 11, the seal 1 also comprises a reinforcing region 12, sometimes referred to as a seal body. The seal 1 is attached to the first component 4 for conjoint rotation therewith. For this purpose the first component 4 includes a radially inwardly oriented groove into which the outwardly oriented reinforcing region 12 extends. In the present exemplary embodiment the first component 4, which is located radially outward of the second component 5, is fixed, while the second component 5 rotates with respect to the first component 4. The seal 1 thus does not rotate. The seal lip 11 extends radially inwardly and rubs against or slides along the second component 5. The seal 1 or the seal lip 11 can comprise, for example, an elastic material, for example, an elastomer or rubber. The reinforcing region 12 can include a material that is harder or stiffer than a material of the seal lip 11, for example a plastic, a metal, a metal plate, or the like. Additionally or alternatively, the reinforcing region 12 can also comprise the elastic material.

In some further exemplary embodiments the seal can also have a different shape; for example it can have a different number of seal lips and/or the at least one seal lip may be pressed against the second component by a spring. Optionally the seal lip can also contact the radially outer-lying component. Under certain circumstances the seal can also be disposed on the component that rotates.

The fluid sealed in the bearing by the seal 1 can be, for example, air, a lubricant, and/or the like. For example, in some exemplary embodiments the seal 1 can also prevent dirt or particles from the environment 14 outside the seal from entering an interior 15 or a bearing interior between the components 4 and 5.

The sensor 6 may be attached to an adapter component 16 and the adapter component 16 may be attached to or held on the seal 1. For this purpose the seal 1 includes a sensor opening 17 disposed in the reinforcing region 12, that is, radially outside the seal lip 11. A position of the sensor opening 17 is eccentric to (not concentric with) a center axis M of the seal 1. The sensor opening 17 has a circular cross-section and a diameter equal to at least one third, at least one half, or at least two thirds of a radial extension, i.e. a ring width, of the seal 1. In the exemplary embodiment of FIG. 1 the sensor opening 17 is smaller than a seal-lip opening (the main opening) of the seal 1, in which seal-lip opening the second component 5 is disposed. In some further, not-depicted exemplary embodiments the sensor opening can have any possible cross-section or size, for example, it may be rectangular, quadrilateral, or the like. Under certain circumstances the sensor opening can have a cross-section that corresponds to a cross-section of the adapter component.

Figure 4:
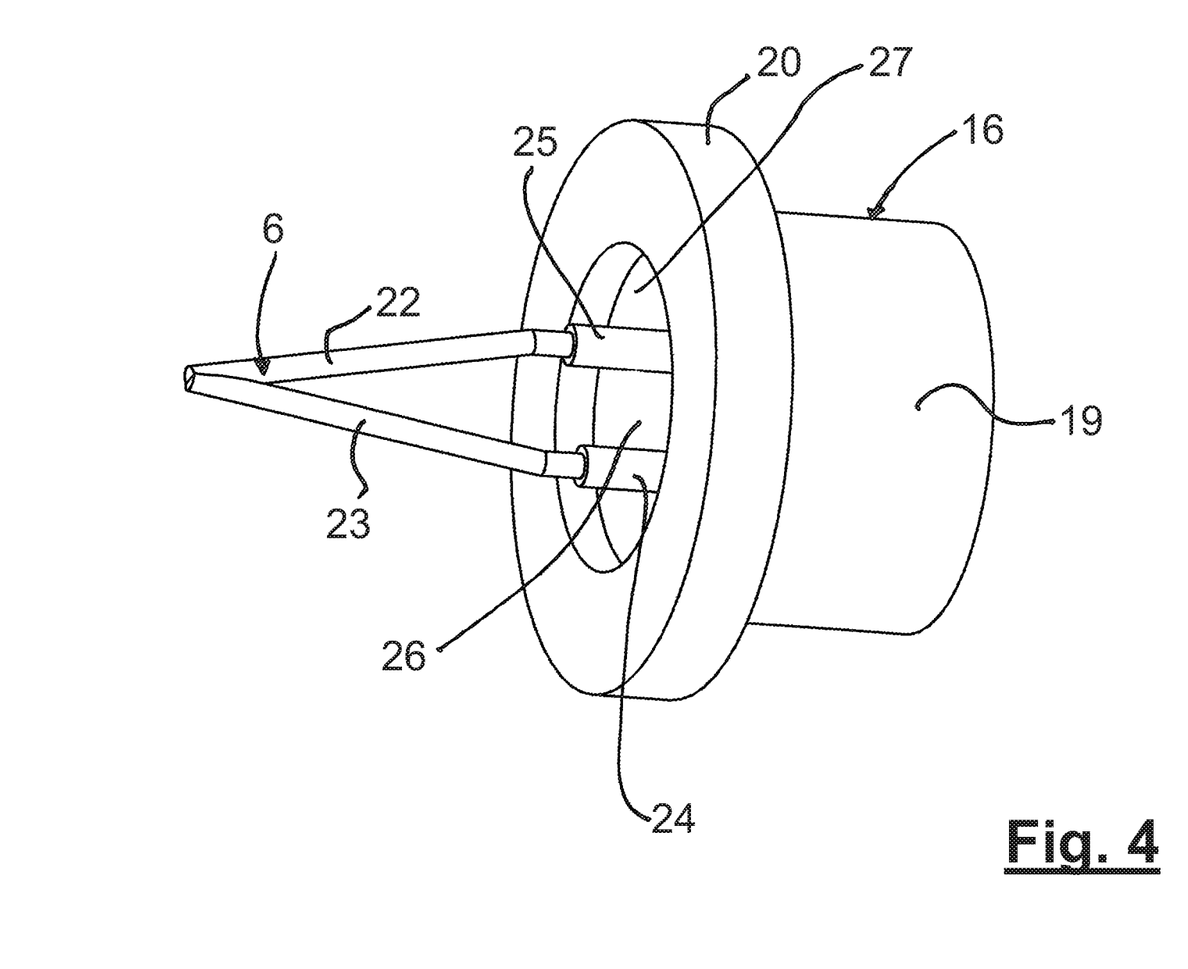
FIG. 4 is a perspective view of a sensor including an adapter component for a seal according to an exemplary embodiment.
Figure 5:
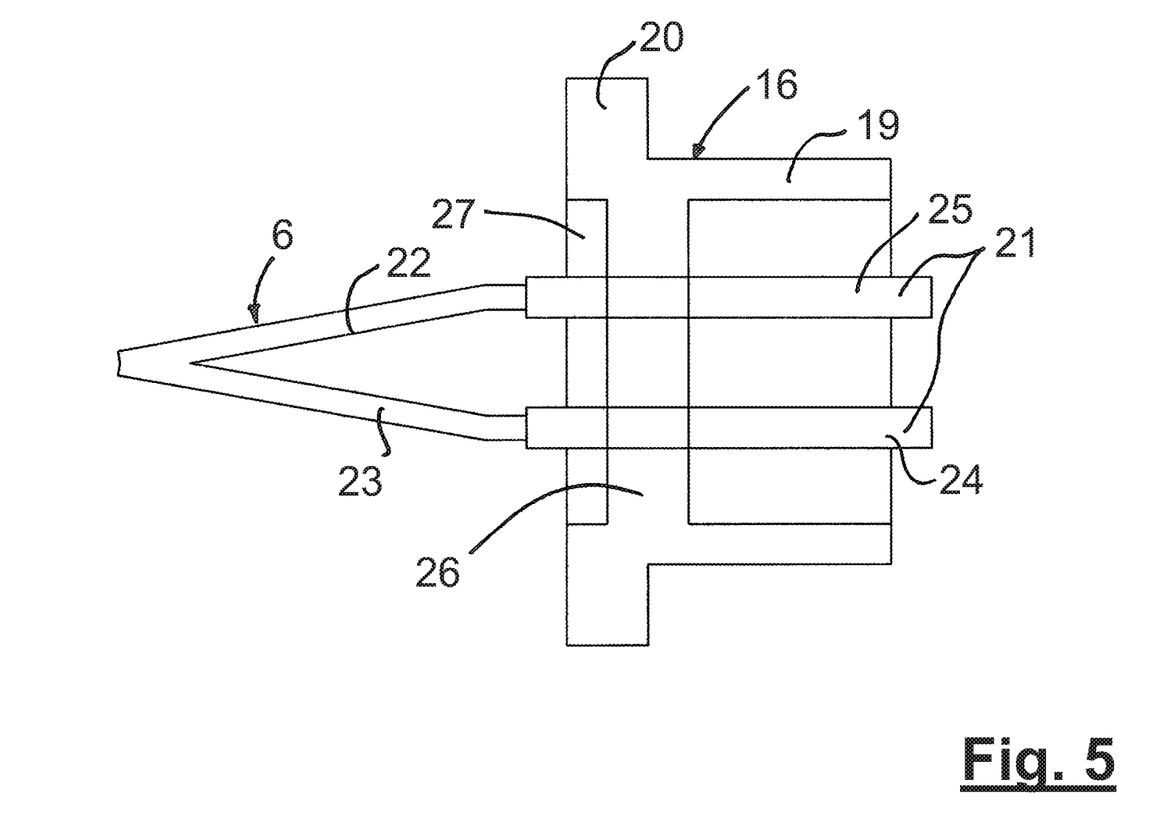
FIG. 5 shows a sectional view of the sensor including the adapter component for a seal of FIG. 4.
Figure 6:
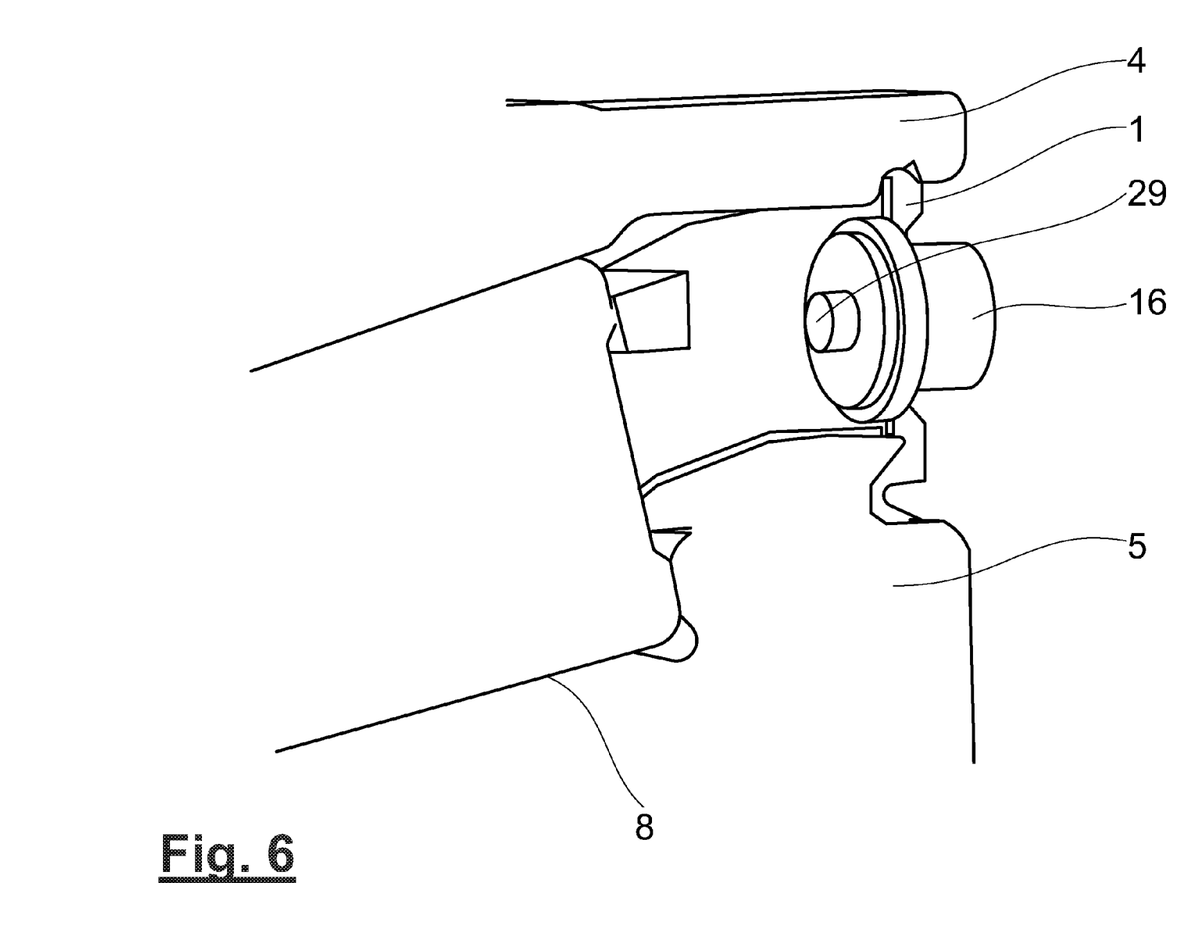
FIG. 6 is a perspective view, partly in section, of a seal in a bearing assembly according to a further exemplary embodiment.
Figure 7:
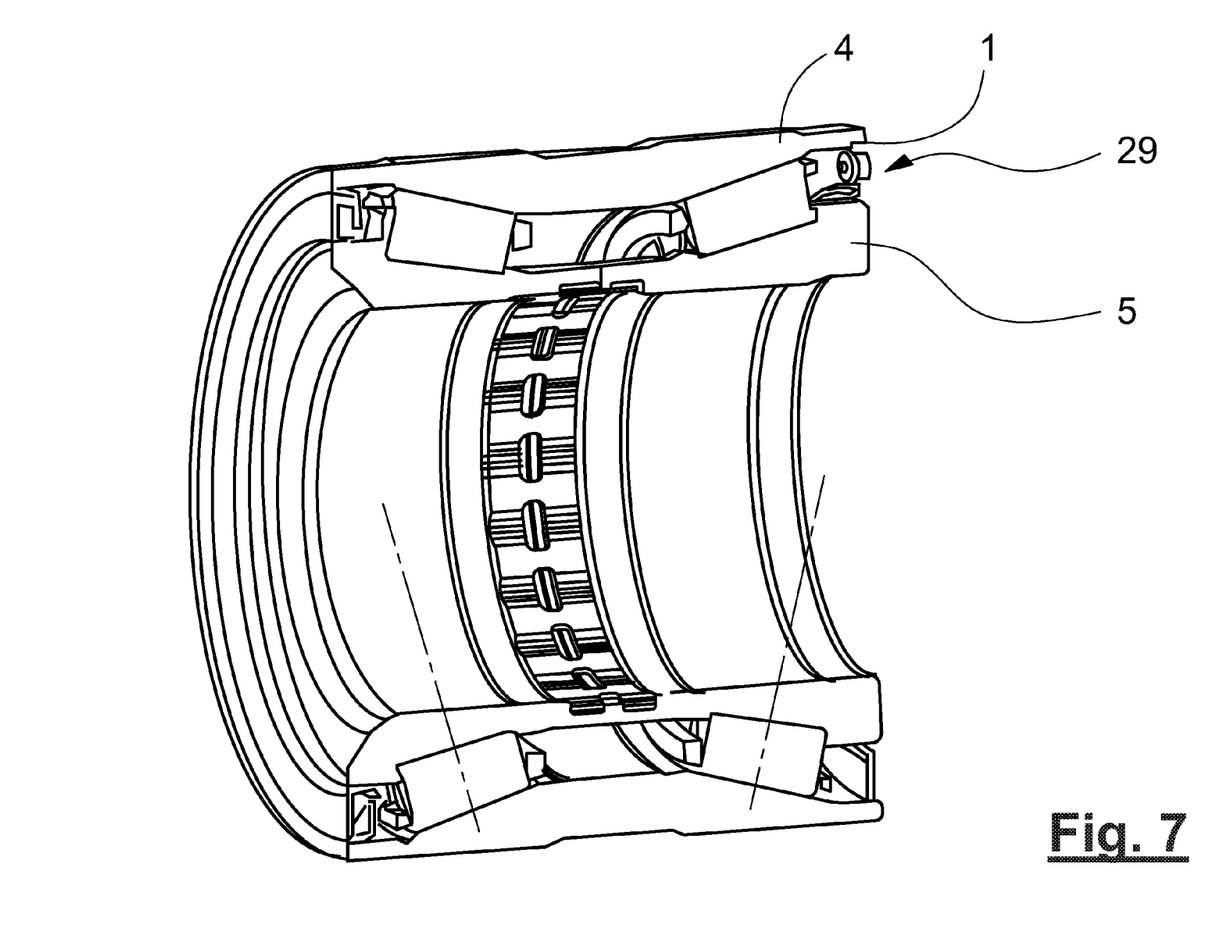
FIG. 7 is a perspective view of a bearing assembly including the seal of FIG. 6.
Figure 8:
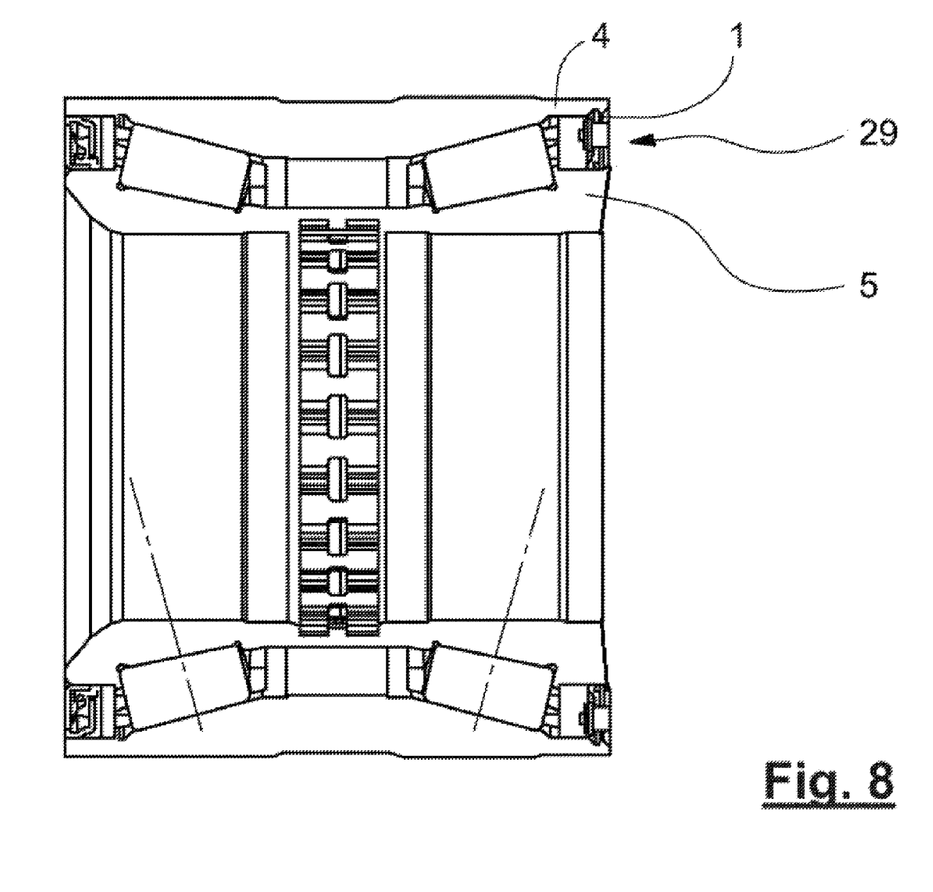
FIG. 8 is a sectional elevational view of the bearing assembly of FIG. 7.
Figure 9:
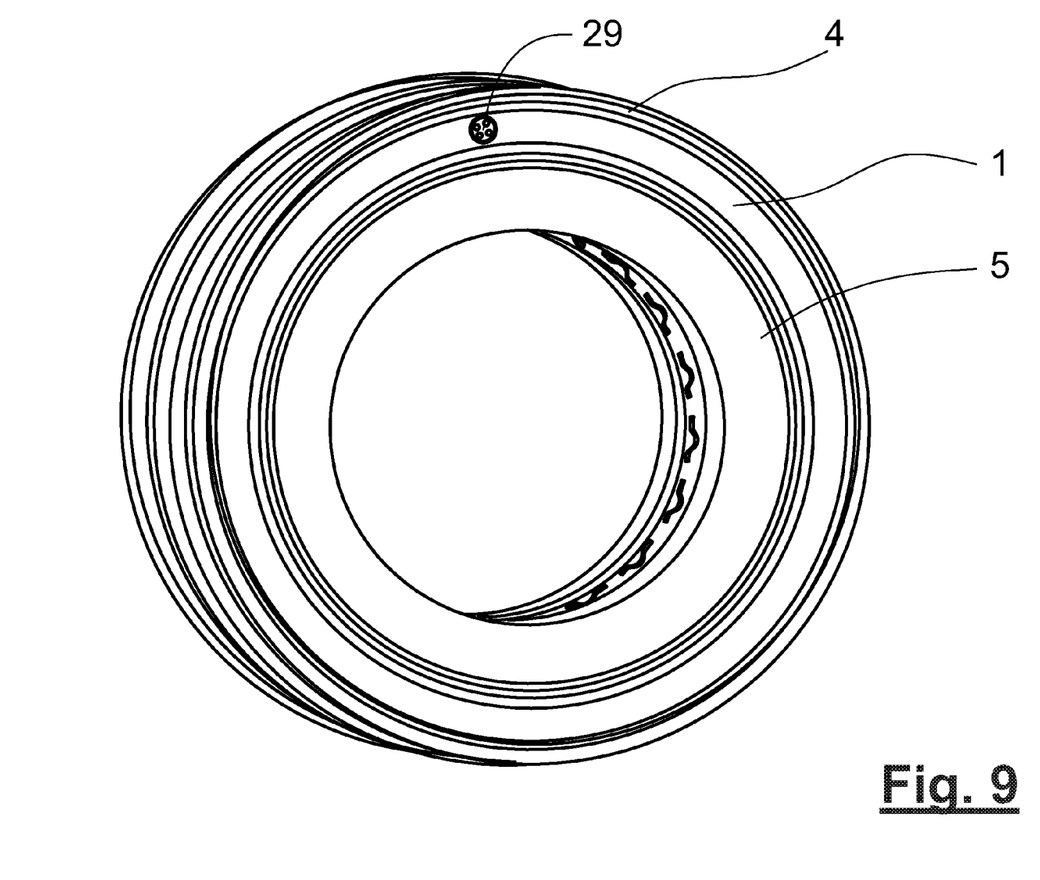
FIG. 9 is a further perspective view of the bearing assembly of FIG. 7.
Figure 10:
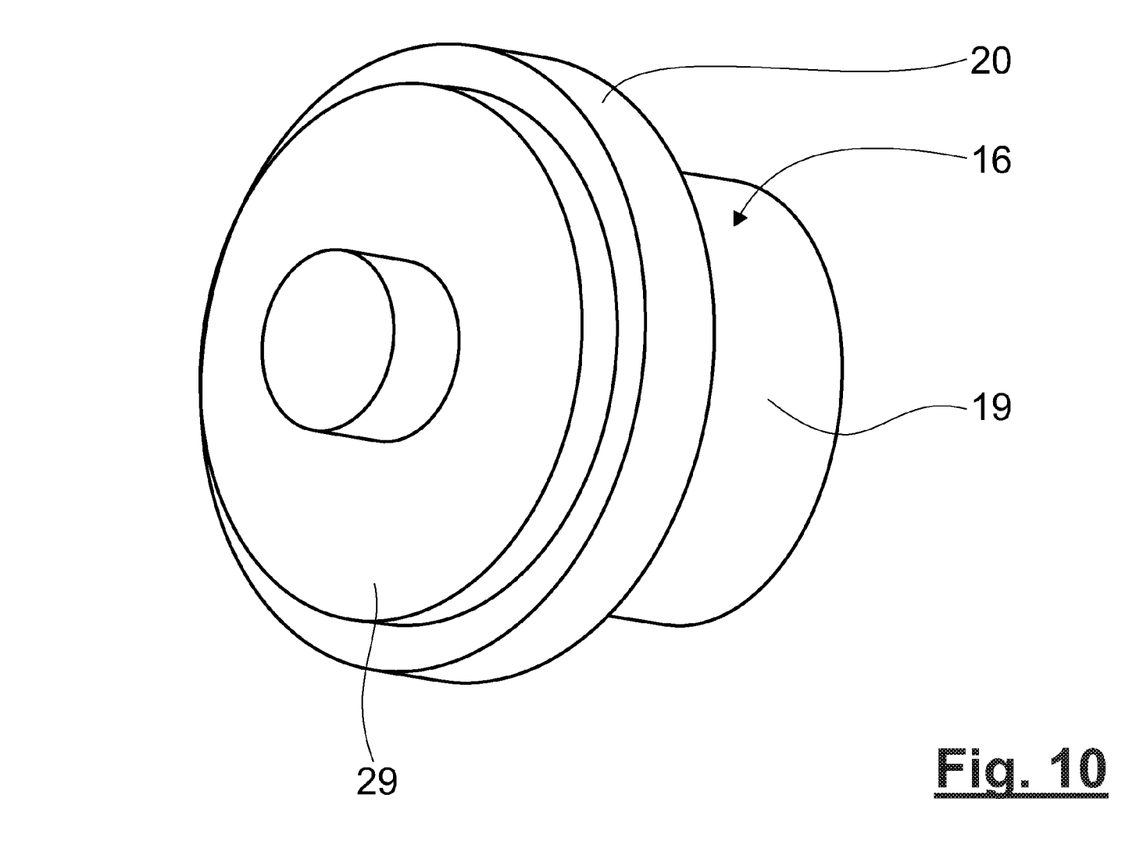
FIG. 10 is a perspective view of a sensor including an adapter component for a seal according to a further exemplary embodiment.
Figure 11:
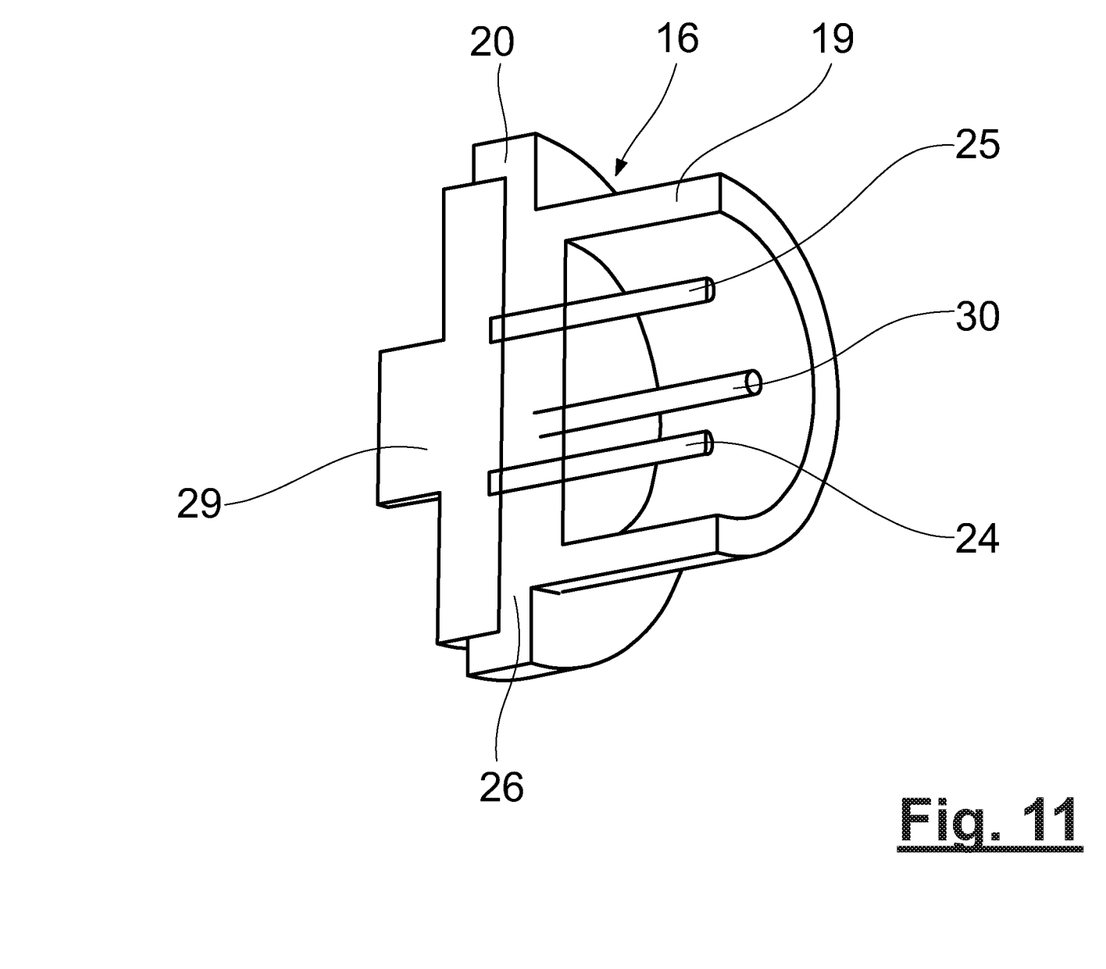
FIG. 11 is a further perspective view, partly in section, of the sensor including an adapter component of FIG. 10.

FIGS. 4 and 5 show different embodiments of the sensor 6 and the adapter component 16. The adapter component 16 has a tubular base body 19 in the shape of a right circular cylinder with a cylindrical outer surface and may have an at least partially hollow interior. It may therefore sometimes be referred to as shaped like a sleeve. The adapter component 16 also includes an axial stop 20. The base body 19 and the axial stop 20 are connected via a plate-shaped component 26 such that the base body 19 is closed in a fluid tight manner in the axial direction. The plate-shaped component 26 is axially offset relative to the axial stop 20 such that a depression 27 is formed on a side facing away from the base body 19. In some further, not-depicted exemplary embodiments the depression can also be omitted and/or the base body can be completely filled.

The adapter component 16 can be centered or held in the sensor opening 17 in the radial direction via the base body 19. The base body 19 has an axial extension that is at least 1, 1.5 or 2 times the thickness of the axial thickness of the seal at the location where it is mounted. The axial stop 20 is configured as a flange and has a greater diameter than the base body 19 and the sensor opening 17. In this way the adapter component 16 can be attached to the seal 1 in the axial direction. In some further, not-depicted exemplary embodiments any component can serve as the adapter component, using which the sensor can be attached to the seal, so that a terminal structure of the sensor can be led out from the interior 15. The adapter component can also possibly be omitted, especially for sensors that have outer housings with a shape that permits them to be mounted in the seal body without an additional adapter body. In other words, the adapter body may be sold as a housing or element of the sensor itself.

As can be seen in FIGS. 1 and 2, the adapter component 16 is disposed such that the axial stop 20 abuts on the side of the seal 1 facing the fluid, that is, facing the bearing interior 15. In some further, not-depicted exemplary embodiments a further attachment element for securing the adapter component 16 on the seal 1 can be disposed on the side of the seal 1 facing away from the axial stop 20, for example, a securing ring, a nut, a bayonet closure, at least one snap element, a press ring, or the like. In some further, not-depicted exemplary embodiments the axial stop can be omitted or disposed on the side of the seal facing away from the fluid. In addition, the adapter component 16 can be sealed against the seal 1 using a not-depicted sealing agent. For example, an adhesive can be used for sealing and/or axial fixing.

The adapter component 16 also includes a terminal structure 21. The terminal structure 21 or plug connector can include, for example, at least two pins 24 and 25 or connector pins. The pins 24, 25 are received in the plate-shaped component 26. In some further, not-depicted exemplary embodiments the terminal structure 21 can also include two, three, four, or a plurality of pins. Optionally the terminal structure 21 can also include depressions into which the corresponding counter-structures can engage. The adapter component 16 can be a plug connector or a bushing of a plug connector. The adapter component 16 can comprise a plastic or a metal as material, or the plug connector can comprise a housing made from a plastic.

The sensor 6 can comprise, for example, at least one thermocouple. As can be seen in FIGS. 4 and 5, the sensor 6 comprises two wire-type thermocouples 22 and 23, which are each connected in an electrically conducting manner to one of the pins 24 or 25 of the terminal structure 21. Here the thermocouple 22 can include a first metal or a metal alloy, for example, nickel (N), and the second thermocouple 23 can include a second metal or a metal alloy that differs from the first metal, for example, a stainless steel (Cr—Ni). The first and second thermocouples 22, 23, touch on a side facing away from the adapter component 16. The first and second thermocouples 22 and 23 are movable or bendable so that they can be bent to a desired position or to a desired measuring location. A position of the thermocouples can thus be adjusted within certain limits. In some further, not-depicted exemplary embodiments the thermocouples can also be stiff, or another temperature sensor can be used.

FIGS. 6 to 9 show different schematic depictions of a seal 1 in a bearing assembly 2 according to a further exemplary embodiment. This embodiment is substantially similar to the exemplary embodiment of FIGS. 1 to 3, but differs in that it includes a pressure sensor 29 configured to measure a pressure in a bearing interior. The sensor 29 may comprise, for example, a pressure sensor, a pressure pick-up, or a measuring cell.

In some further, not-depicted exemplary embodiments the sensor can also be configured to detect both a pressure and a temperature, or the seal can include at least a sensor 6, which is configured to measure the temperature, and a sensor 29, which is configured to measure the pressure.

Figure 12:
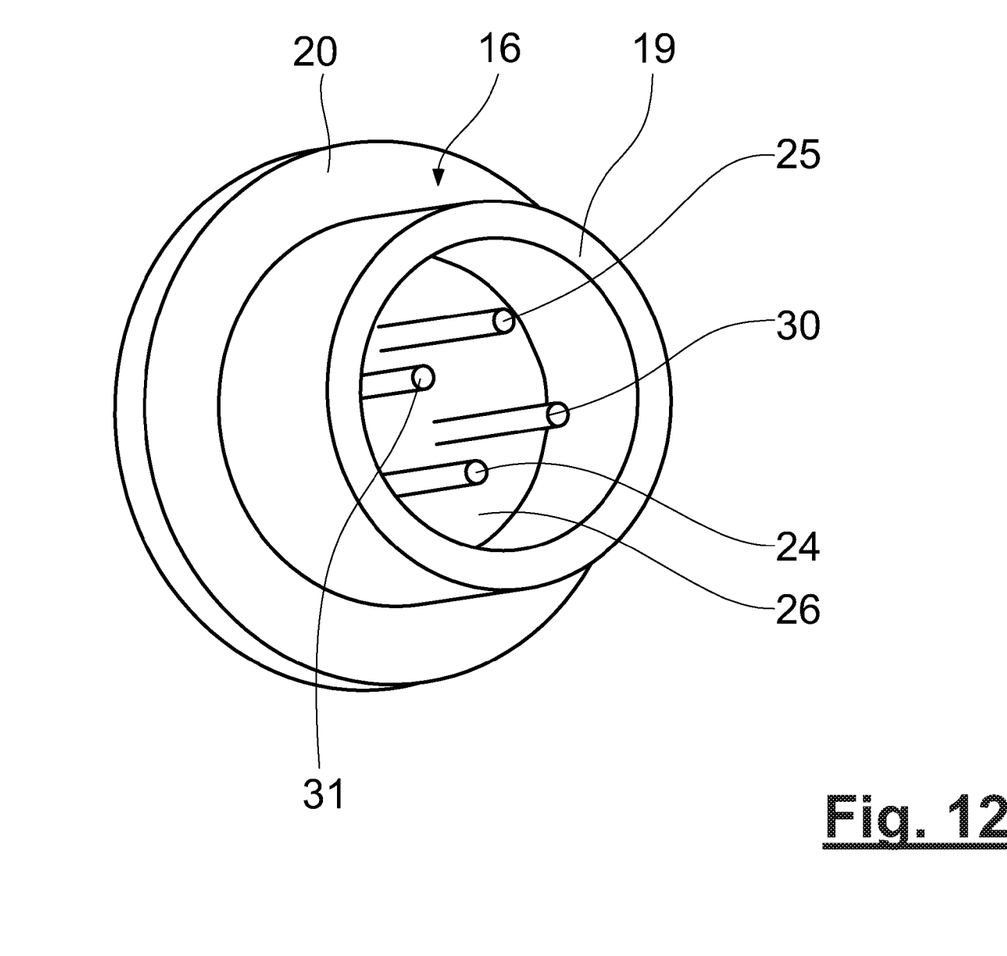
FIG. 12 is a further perspective view of the sensor including the adapter component of FIG. 10.
Figure 13:
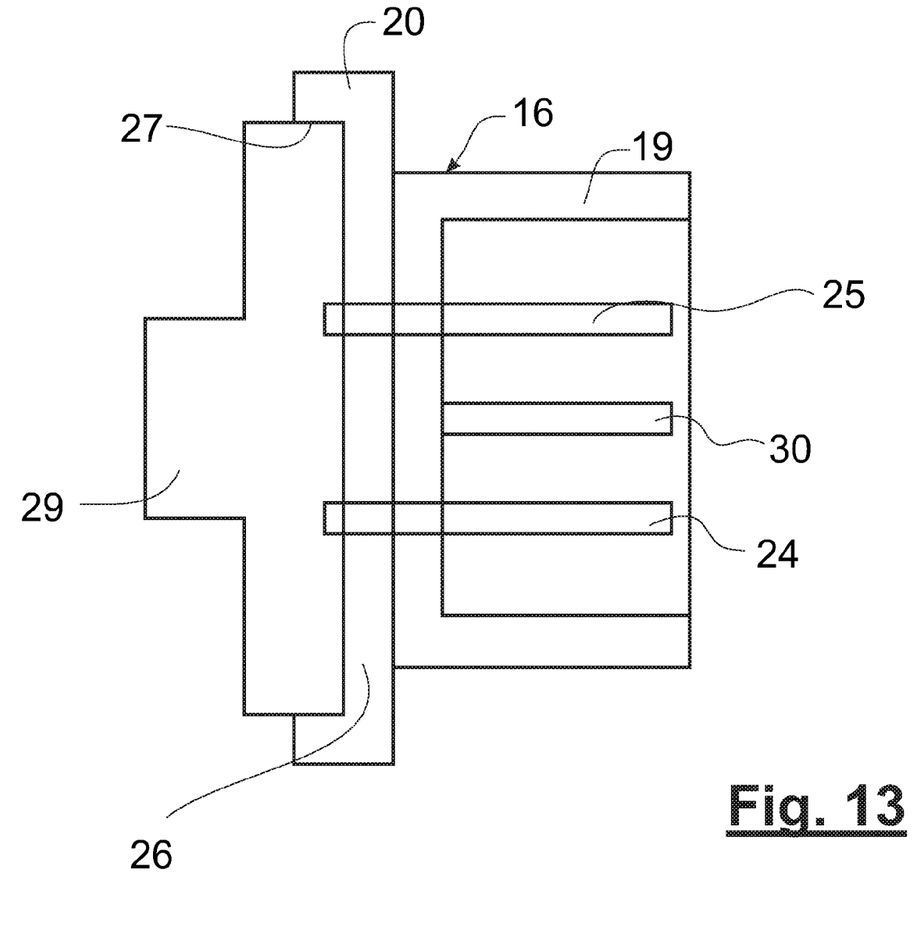
FIG. 13 is a sectional side elevational view of the sensor with an adapter member of the FIG. 10.

FIGS. 10 to 13 show different schematic depictions of the sensor 29 and the adapter component 16 of FIGS. 6 to 9. The pressure pick-up or the sensor 29 has a circumference at its base that fits precisely into the depression 27. As can be seen in FIG. 12, in the exemplary embodiment the adapter component 16 includes four pins 24, 25, 30, and 31. For example, the sensor 29 can be adhered into or clamped into the depression 27 of the adapter component 16. The sensor 29 is connected in an electrically conductive manner to the terminal structure 21.

In other words, in some exemplary embodiments the temperature sensor 3, for example, a thermocouple, and/or also the pressure sensor 29, which can also be referred to as the pressure-measurement element or pressure pick-up, is integrated into a non-rotating radial seal 1. The temperature sensor 6 or the pressure sensor 29 is integrated in the adapter component 16, which can also be configured as a sleeve or plug connector. This "thermo-sleeve" or "pressure-measurement sleeve" is pressed into a sensor opening 17 punched for this purpose and possibly sealed and/or axially fixed using adhesive. If the seal 1 is installed as a non-rotating component, the thermocouple 6 or the pressure-measurement element 29 is located in a bearing interior 15 and can measure the temperature and/or the pressure there. On the outer side 14 of the seal 1 the signal, for example, in the case of the thermocouple, an electrical voltage, can be received via a terminal structure 21, which can also be referred to as a plug, and guided into a central unit that includes a microprocessor for further processing and/or evaluation. In the case of the pressure-measurement element 29, this can be supplied with a voltage, or the measurement signal can be received, on the outer side of the seal 1 via the terminal structure, and guided into a central unit or control unit for further processing and/or evaluation.

In some exemplary embodiments, the seal 1 makes it possible to measure a temperature and/or a pressure in an interior 15 of a sealed bearing or of a bearing unit. In many applications a knowledge of the current operating temperature and/or operating pressure in an interior of a bearing assembly can be an important monitoring parameter and/or control parameter. Under certain circumstances conclusions can be drawn regarding friction by detecting pressure or temperature. This can be the case, for example, since in some exemplary embodiments friction generally corresponds in some manner to temperature and possibly to pressure. Since increased friction leads to energy losses and also, under certain circumstances, to increased wear, in nearly all applications the reduction of friction is a primary design criterion. Measuring the temperature in an interior of the bearing can allow conclusions to be drawn regarding friction and energy losses associated with the bearing, and possibly conclusions regarding wear. Since in many applications friction also corresponds to pressure, for example if an increased operating pressure excessively presses the seal lip 11 of a radial seal onto a sealing (contact) partner or the second component 5 high frictional forces are generated, in some exemplary embodiments measuring the pressure in an interior of a bearing assembly can be ever more important for realizing a reduction in friction.

Using the seal according to some exemplary embodiments, it may be possible avoid the need to modify a bearing structural component, e.g., a bearing ring, in a manner that might reduce its strength or structural integrity. The seal may help reduce overall costs as well since an additional mechanical processing of a component, for example, made from a metal or another difficult-to-process material, that is to receive the sensor, can be omitted. A basic bearing unit can optionally be offered with or without sensor, i.e., in some exemplary embodiments a variety of variants can be achieved with a minimum of effort.

The bearing assembly or the seal 1 including an integrated pressure sensor 29 and/or temperature sensor 6 can be used in any type of rolling-element bearing and/or sliding bearing. Possible applications can be in motor vehicles, machinery, transport machinery, drive machinery, or also in shipbuilding.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seals.

REFERENCE NUMBER LIST

1 Seal
2 Bearing assembly
3 Gap
4 First component
5 Second component
6 Temperature sensor
7 Rolling elements
8 Raceway
11 Seal lip
12 Reinforcing region
14 Environment
15 Interior
16 Adapter component
17 Sensor opening
19 Base component
20 Axial stop
21 Terminal structure
22 Thermocouple
23 Thermocouple
24 Pin
25 Pin
26 Plate-shaped component
27 Depression 29 Pressure sensor
30 Pin
31 Pin
M Center axis

What is claimed is:

1. A seal configured to seal a gap between a first component and a second component to at least partially retain a fluid on a first side of the seal in a space between the first component and the second component, the seal comprising:
   a seal body having a radially outer periphery, a sensor opening having a first diameter, and a central opening configured to receive the first component or the second component,
   at least one sensor configured to detect at least one characteristic of the fluid, and
   an adapter, the at least one sensor being disposed on the adapter, the adapter having a first portion axially abutting the seal body on the first side of the seal, and
   the adapter extending through the seal body forming a second portion on a second side of the seal opposite the first side, the second portion having the first diameter, at a location spaced from and radially between the radially outer periphery and the central opening.

2. The seal according to claim 1, wherein the second component is configured to rotate relative to the first component.

3. The seal according to claim 1, wherein the seal body is fixed to the first component.

4. The seal according to claim 3, wherein the seal has a seal lip that is in contact with and slides against the second component.

5. The seal according to claim 1, wherein the sensor protrudes axially from the adapter.

6. The seal according to claim 1, wherein the second portion of the adapter extends through the sensor opening.

7. The seal according to claim 1, wherein the adapter includes an electrical terminal configured to connect the sensor to a power supply or to a microprocessor.

8. The seal according to claim 1, further including a bonding material securing the adapter to the seal body.

9. The seal according to claim 1, wherein the at least one characteristic is temperature or pressure or both temperature and pressure.

10. The seal according to claim 1,
    wherein the second portion of the adapter is cylindrical and wherein the first portion has at least one width greater than the first diameter.

11. The seal according to claim 1,
    wherein the second component is configured to rotate relative to the first component,
    wherein the sensor protrudes axially from the adapter,
    wherein the at least one characteristic is temperature or pressure or both temperature and pressure,
    wherein the adapter includes an electrical terminal configured to connect the sensor to a power supply or to a microprocessor, and
    further including a bonding material securing the adapter to the seal body.

12. A bearing assembly including the seal according to claim 1, wherein the first component is a bearing outer ring and the second component is a bearing inner ring, wherein the sensor is configured and disposed to measure a pressure or a temperature or both a pressure and a temperature in a bearing interior.

13. A bearing assembly including the seal according to claim 1, wherein the first component is a housing and the second component is a shaft.

* * * * *